(12) United States Patent
Philips

(10) Patent No.: US 7,956,294 B2
(45) Date of Patent: Jun. 7, 2011

(54) SYSTEM AND METHOD FOR PROTECTION AGAINST SKIMMING OF INFORMATION FROM CONTACTLESS CARDS

(75) Inventor: Simon Edward Philips, York (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 11/865,209

(22) Filed: Oct. 1, 2007

(65) Prior Publication Data
US 2008/0149729 A1 Jun. 26, 2008

Related U.S. Application Data

(63) Continuation of application No. PCT/US2006/012053, filed on Apr. 3, 2006.

(60) Provisional application No. 60/667,864, filed on Apr. 1, 2005.

(51) Int. Cl.
*H05K 9/00* (2006.01)
(52) U.S. Cl. ...................... 174/378; 340/572.8
(58) Field of Classification Search ............ 340/527.7, 340/527.8, 572.7, 572.8; 174/377, 378; 206/720, 206/721
See application file for complete search history.

(56) References Cited

U.S. PATENT DOCUMENTS

| | | | |
|---|---|---|---|
| 4,774,148 A * | 9/1988 | Goto | 428/607 |
| 5,255,785 A | 10/1993 | Mackey | |
| 5,597,979 A * | 1/1997 | Courtney et al. | 174/378 |
| 7,482,925 B2 | 1/2009 | Hammad et al. | |
| 2003/0214406 A1* | 11/2003 | Epstein | 340/572.8 |
| 2006/0151207 A1* | 7/2006 | Redman et al. | 174/355 |

FOREIGN PATENT DOCUMENTS

| JP | 07187257 | | 7/1995 |
|---|---|---|---|
| JP | 2005-75454 | * | 3/2005 |
| JP | 2005075454 | | 3/2005 |

OTHER PUBLICATIONS

Machine translation of JP 2005-75454 A on Jul. 27, 2010.*

* cited by examiner

*Primary Examiner* — Hung V Ngo
(74) *Attorney, Agent, or Firm* — Baker Botts LLP

(57) ABSTRACT

Contactless payment cards with on-card microchips are transported in mailers with RF shielding. The RF shielding is designed to prevent communication with and skimming of information from the contactless cards enclosed in the mailers while in transit.

12 Claims, 1 Drawing Sheet

SYSTEM AND METHOD FOR PROTECTION AGAINST SKIMMING OF INFORMATION FROM CONTACTLESS CARDS

CROSS-REFERENCE TO RELATED APPLICATION

This application is a continuation of International Application PCT/US06/012053, filed Apr. 3, 2006, which claims the benefit of U.S. provisional patent application No. 60/667,864 filed on Apr. 1, 2005, each of which is incorporated by reference in its entirety herein.

BACKGROUND OF THE INVENTION

This invention relates to payment cards that are used for malting contactless payment transactions. In particular, the invention relates to techniques for fraud prevention in proximity, contactless or smart card payment systems.

Proximity payments are used in situations where, although the purchaser is present, it is useful or at least more convenient to be able to make a payment without having to make physical contact with the vendor/payee. The purchaser, for example, may use a contactless "smart card" to make a proximity payment without having to manually swipe a card through a conventional point-of-sale device (i.e., a magnetic strip card reader). An exemplary contactless smart card is MasterCard PayPass™. card. This card is an enhanced payment card that features a hidden embedded microprocessor chip and antennae (i.e. a miniature Radio Frequency (RF) transceiver chip and an antenna). The MasterCard PayPass provides a purchaser with a simpler way to pay. The purchaser can simply tap or wave his or her MasterCard PayPass payment card on a specially equipped merchant terminal that then transmits payment details wirelessly using radio frequency signals, eliminating the need to swipe the card through a reader. Account details are communicated directly to the specially equipped merchant terminal and are then processed through MasterCard's highly trusted acceptance network. Moments after the purchaser taps the terminal with his or her MasterCard PayPass card, they receive payment confirmation and are on their way.

Proximity payment systems based on smart cards (such as MasterCard PayPass) may be advantageously implemented in traditional cash-only environments where speed is essential, (e.g., quick serve and casual restaurants, gas stations and movie theaters). Purchaser information, which may be stored in a microchip on the smart card, is sent directly from the microchip to a point-of-sale (POS) device or other wireless reader device, which may be up to about 10 cms away. Proximity payments also may be made using other payment devices (e.g., a mobile phone, PDA, or handheld computer), which are suitably configured to carry a microchip that stores and retransmits stored or processed account information when required. Common industry infrared or wireless protocols (e.g., Bluetooth) may govern communication between the payment device and the vendor/payee's wireless reader or POS device.

As with electronic payment transactions conducted over the Internet and other e-commerce transactions, both parties to a proximity payment transaction will have security concerns. Payers need reassurance that the vendor/payees are not unscrupulous criminals who will misuse payer information, the vendor/payees need to know that the payers are legitimate and both parties need to know that unauthorized third parties cannot intercept the transaction information. A number of techniques, which address at least some of these security concerns, are available. Data encryption techniques, for example, can be used to secure transaction information during transmission.

The proximity and smart card payment systems take advantage of the new on-card chip technology to deploy cardholder verification methods to make secure transactions. Purchases made with the cards can be verified, for example, uses of a personal identification number, or PIN. The proximity and smart cards aim to cut fraud by including an on-card microchip, which can store more information than the usual magnetic strips, and also by having users verify transactions by keying in a personal identification number (PIN) rather than signing a receipt. However, as with any technology, the security provided by on-card chip technology is not infallible. Fraudsters can find new ways of illegally accessing cardholder information to breach security.

Consideration is now directed toward improving schemes for safeguarding cardholder information to prevent, for example, fraudulent use of stolen or lost payment cards. In particular, attention is directed to securing the information contained in proximity, contactless or smart payment cards.

BRIEF DESCRIPTION OF THE DRAWINGS

Further features of the invention, its nature, and various advantages will be more apparent from the following detailed description and the accompanying drawings, wherein like reference characters represent like elements throughout, and in which.

DESCRIPTION OF THE INVENTION

Figure 1:
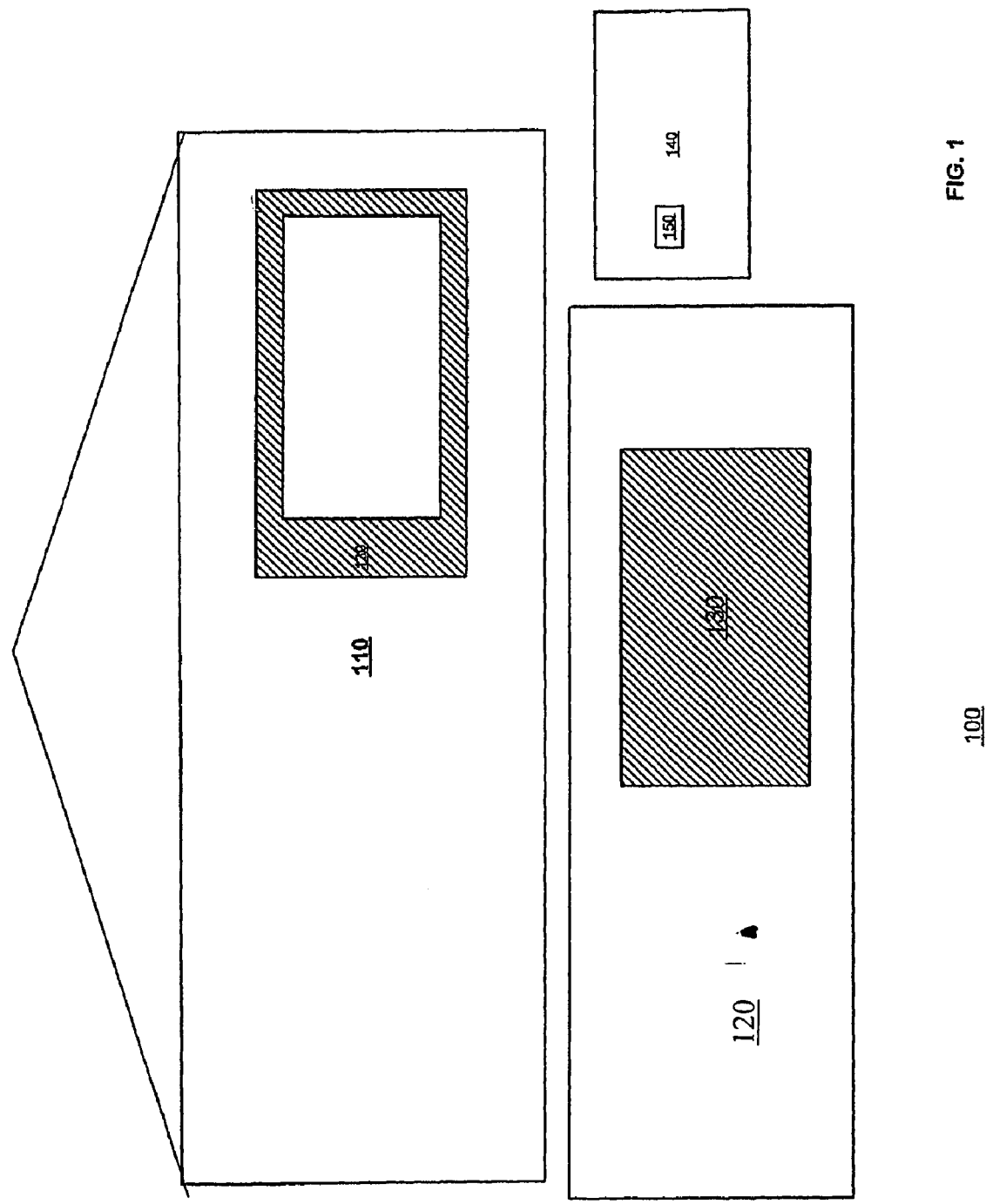
FIG. 1 is an illustration of an exemplary mailer having RF-shielding material, which is designed to interfere with intruding RF-signals from communicating with an enclosed payment card having an on-card microchip, in accordance with the principles of the invention.

In accordance with the present invention, a system and a method are provided for safeguarding cardholder information stored in proximity, contactless or smart cards. The system and a method involve transporting the cards in RF-shielded environments that prevent unauthorized RF intrusion or access to the on-card chip circuits. The invention advantageously further reduces opportunities for fraud in payment-by-card systems.

The advantages of the invention may be understood with reference to counterfeiting, which is a type of card fraud that is prevalent with current electronic or paper payment systems that are based, for example, on plastic cards in which magnetic stripes or embossed structures contain cardholder information. A counterfeit card is one that has been printed, embossed or encoded without the consent or knowledge of the card issuer, or one that has been validly issued but has then been altered or recoded. A common method of counterfeiting is called skimming, in which the counterfeiters copy the information stored in the magnetic stripes on plastic cards. The counterfeiter copies the information stored in the magnetic stripe, for example, by swiping it through a small card reader. Armed with this information, the counterfeiter can then produce counterfeit cards and use them to carry out fraudulent transactions.

Proximity, contactless and smart cards in which computer chips are embedded hold more information, but in a more secure environment, than can be stored magnetic stripe cards. However, in some circumstances a thief or counterfeiter may be able to access the information stored in proximity or smart cards.

The present invention is designed to preclude skimming (i.e., stealing) of cardholder information when proximity, contactless or smart cards are in transit, for example, sent to the cardholders through public mail.

The on-card chips have electronic circuits, which exploit electromagnetic or electrostatic coupling in the radio frequency (RF) portion of the electromagnetic portion of the electromagnetic spectrum to communicate with card reader units (e.g., Point of Sale devices). A card reader unit may include an RF antenna and a transceiver. The reader unit emits radio waves, and when a proximity, contactless or smart card is placed within the range of the card reader unit, the on-card chip responds and starts sending data to the reader unit. The on-card chips themselves may come in a wide variety of size, shapes and forms but have common attributes; each includes low-energy broadcast circuitry, programmable data storage and operating circuitry. The on-card chips may be with and without batteries, and they can be read only or read/write. Typically, on-card chips without batteries (passive circuits) are smaller and lighter than those that are with batteries (active circuits), and less expensive. The passive on-card chip circuits are powered and activated by the reader units. In either case, when activated on-card chip circuits can broadcast stored information over radio frequency waves.

At least theoretically, it is possible for an unauthorized person or fraudster to use a card reader or similar RF device to extract cardholder information stored in an on-card chip in a manner similar to using an unauthorized magnetic stripe card reader to skim information form magnetic stripe cards. In the case of proximity, contactless or smart cards, a potential opportunity for accessing card information arises when card issuers sent cards by the to cardholders by mail, for example, in conventional postal envelopes or mailing packages. The unauthorized person or fraudster may use a card reader or similar RF device to activate the on-chip card and extract card information while the card is in transit. The unauthorized person may literally do so without opening the envelope—possibly even while the card is still in a mailbox.

According to the present invention, the cards are sent to cardholders enclosed in mailers with RF-shielding, which prevents external radio frequency waves from penetrating the mailer and activating or communicating with the enclosed cards. An exemplary mailer 100 may include a conventional paper envelope 110 and/or paper or cardboard insert 120 to which the proximity, contactless or smart card 140 is tacked onto or attached. (See FIG. 1). RF-shielding material 130 is disposed on paper envelope 110, for example, on interior surfaces proximate to the enclosed card. Alternatively or additionally, RF-shielding material 130 may be disposed on insert 120. RF shielding material 130 may be any suitable material that interferes with the transmission of RF frequency waves. The suitable RF shielding materials may, for example, include conductive inks, metallic films or paper, wire screens, and wire mesh pouches. In some cases, RF-shielding material 130 may simply be a metallic adhesive (e.g., a conductive rubber cement) that can be used to tack the enclosed smart card in position. It will be understood that according to the present invention, RF-shielding material 130 is selected and its geometrical disposition is designed based on known electromagnetic effects (e.g., skin depth) so that it (RF-shielding material 130) effectively interferes with RF signals to or from the on-card chip 150. Thus, the inventive mailer prevents unauthorized detection or reading of the enclosed card.

It will be understood that the foregoing is only illustrative of the principles of the invention, and that various modifications can be made by those skilled in the art without departing from the scope and spirit of the invention.

The invention claimed is:

1. A method for transporting a payment card having an on-card microchip, the method comprising:
   providing a mailer having at least a portion with no RF-shielding material disposed thereon;
   providing an insert dimensioned to be insertable in said mailer, the insert having RF-shielding material disposed thereon; and
   attaching the payment card to the insert, wherein the RF-shielding material is disposed in a manner so that it interferes with external RF signals from reaching the on-card microchip when the insert is placed within said mailer;
   wherein at least a portion of said mailer has RF-shielding material disposed thereon.

2. The method of claim 1 wherein the mailer comprises an envelope, and wherein the RF-shielding material is disposed on an interior surface portion of the envelope.

3. The method of claim 1 wherein the RF-shielding material is disposed on the mailer proximate to the enclosed payment card.

4. The method of claim 1 wherein the RF-shielding material comprises a conductive ink.

5. The method of claim 1 wherein the RF-shielding material comprises a metallic film.

6. The method of claim 1 wherein the RF-shielding material comprises a wire mesh.

7. A system for preventing unauthorized skimming of information from a payment card in transit, the payment card having an on-card microchip that is activated by and communicates via radio frequency signals, the system comprising:
   a mailer enclosing the payment card in transit, said mailer having at least a portion with no RF-shielding disposed thereon; and
   an insert having RF-shielding material disposed thereon dimensioned to be insertable in said mailer, said insert including means for coupling to said payment card, wherein RF-shielding material is disposed so that it interferes with external RF signals from reaching the on-card microchip, when the insert is placed within said mailer;
   wherein at least a portion of said mailer has RF-shielding material disposed thereon.

8. The system of claim 7 wherein the mailer comprises an envelope, and wherein the RF-shielding material is disposed on an interior surface portion of the envelope.

9. The system of claim 7 wherein the RF-shielding material is disposed on the mailer proximate to the enclosed payment card.

10. The system of claim 7 wherein the RF-shielding material comprises a conductive ink.

11. The system of claim 7 wherein the RF-shielding material comprises a metallic film.

12. The system of claim 7 wherein the RF-shielding material comprises a wire mesh.

* * * * *